(12) United States Patent
Thompson et al.

(10) Patent No.: US 11,498,582 B2
(45) Date of Patent: Nov. 15, 2022

(54) AIR INDUCTION SYSTEM WITH WATER DETECTION

(71) Applicants: Eric R Thompson, Lake Orion, MI (US); Douglas E Rutter, Rochester, MI (US); Stephen J Buckley, Novi, MI (US)

(72) Inventors: Eric R Thompson, Lake Orion, MI (US); Douglas E Rutter, Rochester, MI (US); Stephen J Buckley, Novi, MI (US)

(73) Assignee: FCA US LLC, Auburn Hills, MI (US)

(*) Notice: Subject to any disclaimer, the term of this patent is extended or adjusted under 35 U.S.C. 154(b) by 337 days.

(21) Appl. No.: 16/778,979

(22) Filed: Jan. 31, 2020

(65) Prior Publication Data

US 2021/0237756 A1 Aug. 5, 2021

(51) Int. Cl.
*B60W 50/14* (2020.01)
*G01F 23/28* (2006.01)
*B60K 13/02* (2006.01)
*B60W 50/00* (2006.01)
(Continued)

(52) U.S. Cl.
CPC .............. *B60W 50/14* (2013.01); *B60K 13/02* (2013.01); *B60W 50/0098* (2013.01);
(Continued)

(58) Field of Classification Search
CPC ............. B60W 50/14; B60W 50/0098; B60W 2050/146; B60W 10/06; B60W 10/08; B60W 20/20; B60K 13/02; B60K 6/22; G01F 23/282; H04W 4/48; F02M 35/10013; F02M 35/10255; F02M 23/08; F02M 35/0205; F02M 35/0209; F02M 35/09; F02M 35/10229; F02M 35/10262;
(Continued)

(56) References Cited

U.S. PATENT DOCUMENTS 9,884,555 B2   2/2018   Tran et al.
10,119,502 B2  11/2018  Madeira
(Continued)

FOREIGN PATENT DOCUMENTS

CN   104296833 A   1/2015
CN   107687878 A   2/2018
(Continued)

OTHER PUBLICATIONS

International Search Report and Written Opinion dated May 6, 2021 for International Application No. PCT/US2021/015447, International Filing Date Jan. 28, 2021.

*Primary Examiner* — Brian P Sweeney
(74) *Attorney, Agent, or Firm* — Ralph E. Smith

(57) ABSTRACT

A vehicle includes an internal combustion engine and an air induction system configured to provide intake air to the internal combustion engine. The air induction system includes an intake port, an air box coupled to the intake port and having a wet side air box and a dry side air box, at least one sensor disposed within the air box and configured to detect a presence or level of liquid within the air box, and a watertight door disposed within the air box and configured to move between an open position that allows air to pass through the air box dry side, and a closed position that facilitates preventing liquid from passing into the air box dry side.

19 Claims, 2 Drawing Sheets

(51) Int. Cl.
*H04W 4/48* (2018.01)
*B60K 6/22* (2007.10)
*F02M 35/10* (2006.01)

(52) U.S. Cl.
CPC .......... *G01F 23/282* (2013.01); *H04W 4/48* (2018.02); *B60K 6/22* (2013.01); *B60W 2050/146* (2013.01); *F02M 35/10013* (2013.01); *F02M 35/10255* (2013.01)

(58) Field of Classification Search
CPC .......... F02M 35/10373; F02M 35/088; Y02T 10/12; Y02T 10/62; F02D 29/02; F02D 2041/228; F02D 2200/04; F02D 41/22
See application file for complete search history.

(56) References Cited

U.S. PATENT DOCUMENTS

| | | | |
|---|---|---|---|
| 2002/0059912 A1* | 5/2002 | Bauer | .................. F02M 35/024 123/196 R |
| 2018/0162182 A1 | 6/2018 | Coombs | |
| 2019/0291666 A1 | 9/2019 | Martin et al. | |
| 2021/0170860 A1* | 6/2021 | Ciccone | .................. F02M 35/16 |

FOREIGN PATENT DOCUMENTS

| | | |
|---|---|---|
| CN | 109356755 A | 2/2019 |
| DE | 102012211251 A1 | 1/2013 |
| DE | 102012014199 A1 | 2/2014 |
| WO | 2012080429 A1 | 6/2012 |
| WO | 2012080430 A1 | 6/2012 |
| WO | 2012080431 A1 | 6/2012 |
| WO | 2012080432 A1 | 6/2012 |
| WO | 2012080433 A1 | 6/2012 |
| WO | 2012080435 A1 | 6/2012 |
| WO | 2012080437 A1 | 6/2012 |
| WO | 2012080438 A1 | 6/2012 |
| WO | 2012080439 A1 | 6/2012 |
| WO | 2012080440 A1 | 6/2012 |
| WO | 2018/132082 A1 | 7/2018 |

* cited by examiner

AIR INDUCTION SYSTEM WITH WATER DETECTION

FIELD

The present application relates generally to vehicle air induction systems and, more particularly, to water detection systems and methods for an air induction system of a motor vehicle.

BACKGROUND

In some vehicle operations, such as water fording, water can be ingested into the air induction system and possibly passed to the engine, which can potentially result in a hydrostatic lock (hydrolock) that could potentially cause damage to the engine. To prevent liquid ingestion, some vehicles include drain holes in the air induction system. However, in deep water, the water can potentially enter these drain holes and still flood the air induction system. Thus, while such conventional systems work well for their intended purpose, there remains a desire for improvement in the relevant art.

SUMMARY

According to one example aspect of the invention, a vehicle is provided. In one example configuration, the vehicle includes an internal combustion engine and an air induction system configured to provide intake air to the internal combustion engine. The air induction system includes an intake port, an air box coupled to the intake port and having a wet side air box and a dry side air box, at least one sensor disposed within the air box and configured to detect a presence or level of liquid within the air box, and a watertight door disposed within the air box and configured to move between an open position that allows air to pass through the air box dry side, and a closed position that facilitates preventing liquid from passing into the air box dry side.

In addition to the foregoing, the described vehicle may include one or more of the following features: an actuator operably associated with the watertight door and configured to move the watertight door between the open and closed positions; wherein the watertight door is disposed within the dry side air box; an air filter disposed between the wet side air box and the dry side air box; wherein the at least one sensor is a water level sensor; wherein the water level sensor is disposed within a reservoir defined in the wet side air box; and wherein a plurality of drain holes are formed in a floor of the reservoir.

In addition to the foregoing, the described vehicle may include one or more of the following features: a control system including a controller in signal communication with the at least one sensor and the watertight door, wherein the controller is configured to close the watertight door based on one or more signals received from the at least one sensor; wherein the controller is configured to close the watertight door when the one or more signals indicate a liquid level in the air box wet side has reached a predetermined level; and a vehicle display in signal communication with the controller, wherein the controller is configured to display a message on the vehicle display when the one or more signals indicate the liquid level in the air box wet side has reached the predetermined level.

In addition to the foregoing, the described vehicle may include one or more of the following features: wherein the message indicates that the internal combustion engine may be shut down due to risk of liquid intrusion; wherein the message indicates that the internal combustion engine will be shut down due to risk of liquid intrusion; a tire inflation system, wherein the controller is configured to direct the tire inflation system to supply air to the dry side air box when the watertight door is in the closed position; and wherein the tire inflation system comprises an air compressor, an air tank, and a conduit fluidly coupled between the air tank and the dry side air box and configured to supply pressurized air therebetween.

In addition to the foregoing, the described vehicle may include one or more of the following features: wherein the control system further includes a radio, an engine control module, a body control module, a radio frequency hub, and an instrument panel cluster in signal communication with the controller; a vehicle electric motor, wherein the controller is configured to direct a motor control module to provide electrically powered locomotion to the vehicle when the watertight door is in the closed position; and a radio frequency hub in signal communication with the controller, wherein the controller is configured to send a message via the radio frequency hub to other vehicles in predetermined group and/or area when the one or more signals indicate a liquid level in the air box wet side has reached the predetermined level.

According to another example aspect of the invention, a method of operating a vehicle is provided. In one example implementation, the vehicle includes an internal combustion engine and an air induction system having an intake port, an air box coupled to the intake port and having a wet side air box and a dry side air box, at least one sensor disposed within the air box and configured to detect a presence or level of liquid within the air box, and a watertight door disposed within the air box and configured to move between an open position that allows air to pass through the air box dry side, and a closed position that facilitates preventing liquid from passing into the air box dry side. The method includes monitoring the at least one sensor, closing the watertight door when one or more signals from the at least one sensor indicate a liquid level in the air box wet side has reached a predetermined level, displaying, when the liquid level as reached the predetermined level, a message on a vehicle display indicating that the internal combustion engine may be and/or will be shut down due to a risk of liquid intrusion, and performing at least one of (i) directing, when the watertight door is moved to the closed position, a tire inflation system to provide air to the internal combustion engine, and (ii) activating an electric motor to drive the vehicle when the watertight door is moved to the closed position and/or the internal combustion engine is shut down.

In addition to the foregoing, the described method may include one or more of the following features: operably associating an actuator with the watertight door, the actuator configured to move the watertight door between the open and closed positions, disposing the watertight door within the dry side air box, providing the at least one sensor as a water level sensor, disposing the water level sensor within a reservoir defined in the wet side air box, and forming a plurality of drain holes in a floor of the reservoir; and sending a message via a radio frequency hub to other vehicles in predetermined group and/or area when the one or more signals indicate a liquid level in the air box wet side has reached the predetermined level.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

The present application is directed to a vehicle air induction system configured to prevent hydrolock in an internal combustion engine. The air induction system is generally configured to actively monitor and detect water in the air box, turn off the engine, and seal-off the air induction system to prevent water intrusion into the engine. Additionally, a control system is configured to display messages to the driver indicating air induction system status such as, for example, the system is ingesting water or the engine will be shut down to protect the engine from water.

Figure 1:
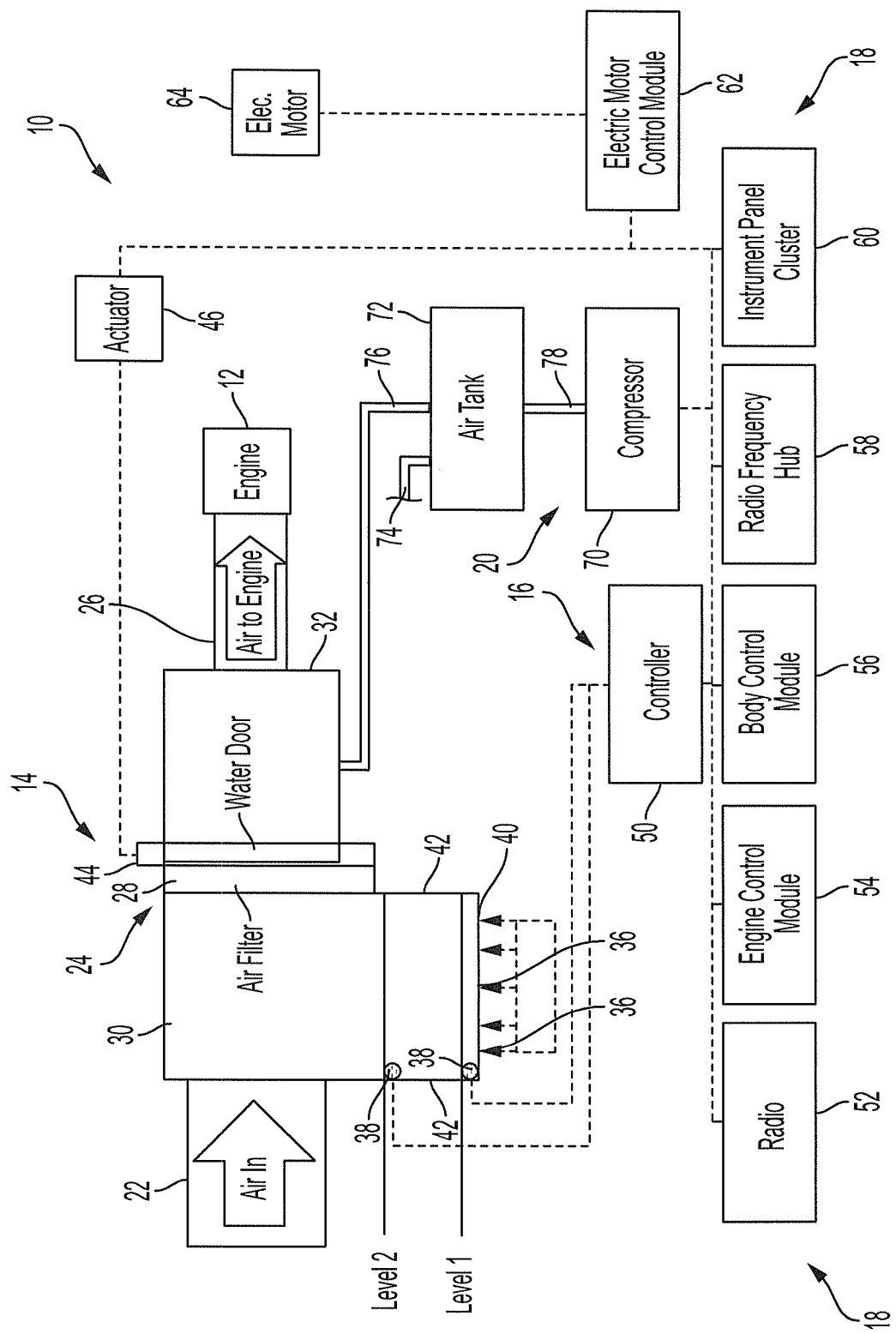
FIG. 1 is a schematic illustration of a vehicle having an example air induction system, in accordance with the principles of the present disclosure.

Referring now to the drawings, FIG. 1 schematically illustrates a vehicle 10 generally having an internal combustion engine 12, an air induction system 14, a control system 16, a display 18, and a tire inflation system 20. The control system 16 is configured to detect the presence of water in the air induction system 14 and subsequently fluidly seal-off the air induction system 14 and inform the driver via display 18, as described herein in more detail.

As shown in FIG. 1, in the example embodiment, the air induction system 14 generally includes an intake port 22, an air box 24, and an air induction duct 26. The intake port 22 is fluidly coupled to the air box 24, which includes an air filter 28 disposed between a wet side 30 and a dry side 32. In the illustrated example, the wet side air box 30 includes a reservoir 34 having a plurality of drain holes 36 and one or more sensors 38. The reservoir 34 is disposed below the air filter 28 to define a low point of the dry side 32 such that any liquid entering the air box 24 is directed to the reservoir 34 rather than toward the dry side 32. The drain holes 36 are formed in a floor 40 and/or side walls 42 of the wet side air box 30 and are configured to drain liquid (e.g., water) from the reservoir 34. The one or more sensors 38 are in signal communication with the control system 16 and configured to detect the presence of liquid and/or measure a level or depth of the liquid within the wet side air box 30.

In the example embodiment, a watertight door 44 is disposed in the air box dry side 32 and is operably coupled to an actuator 46. It will be appreciated, however, that watertight door 44 may be disposed in various other locations of the air induction system 14 to facilitate preventing liquid passage such as, for example, the wet side air box 30. The actuator 46 is configured to move the watertight door 44 between an open position that allows air to pass through the air box dry side 32, and a closed position that facilitates preventing liquid from passing into the air box dry side 32. In the example embodiment, the actuator 46 is an electro-mechanical actuator in signal communication with the control system 16. However, it will be appreciated that actuator 46 can be any suitable actuator that enables air induction system 14 to function as described herein. For example, actuator 46 may be a hydraulic or pneumatic actuator.

In a typical vehicle operation, air supplied to the air box 24 from the intake port 22 is subsequently passed through the air filter 28 and enters duct 26 via the air box dry side 32. The duct 26 subsequently supplies air to a charger or engine intake manifold (not shown) and ultimately to the engine 12. It will be appreciated, however, that air induction system 14 may have various other configurations based on the packaging space and various other requirements of a particular vehicle.

With continued reference to FIG. 1, in one example, control system 16 includes a controller 50 in signal communication with tire inflation system 20, sensors 38, actuator 46, a radio 52 (e.g., infotainment center), an engine control module (ECM) 54, a body control module (BCM) 56, a radio frequency hub 58, an instrument panel cluster 60, and an electric motor control module 62. The controller 50 is in signal communication with such components in order to receive/send information and/or control those components to prevent damage to the engine 12 when liquid is ingested into the air induction system 14.

In the example embodiment, the radio 52 is disposed within a passenger compartment of the vehicle 10 (e.g., in a front console, instrument panel, etc.) and is configured to receive a signal from the controller 50 and provide a message/warning based on that signal. The ECM 54 is in signal communication with the engine 12 and is configured to, amongst other operations, selectively shut off the engine 12, as described herein in more detail. The BCM is a main central computing hub configured to monitor and control various electric accessories in the vehicle body.

In the example embodiment, the radio frequency hub 58 is a module configured to support and control all wireless radio frequency communication in the vehicle including, for example, internet, Bluetooth, and keyfob connectivity. The instrument panel cluster 60 is disposed within the passenger compartment of the vehicle 10 (e.g., in a dashboard or instrument panel) and is configured to receive a signal from the controller 50 and provide a message/warning based on that signal. The electric motor control module 62 is in signal communication with an electric motor 64 of the vehicle 10 and is configured to selectively operate the electric motor 64 to drive the vehicle, for example, when the watertight door 44 is closed or the engine 12 is shut down to prevent engine damage from water intrusion.

In the example embodiment, the display 18 is a user interface or user in-vehicle display (e.g., infotainment center display, instrument panel cluster display, etc.) and includes radio 52, instrument panel cluster 60, and/or additional components for providing messages/warnings to the vehicle driver (e.g., visual, audio, haptic, etc.). In this way, the controller 50 is configured to provide various information about the vehicle and air induction system 14 to a user/driver via the display 18, based at least in part on signals from the sensors 38, as described herein in more detail.

In one example embodiment, vehicle 10 is equipped with the tire inflation system 20, which is configured to selectively inflate or deflate wheels of the vehicle (not shown). In the illustrated embodiment, tire inflation system 20 generally includes an air compressor 70, an air tank 72, a first conduit 74, and a second conduit 76. The air compressor 70 is configured to selectively compress air and supply the compressed air via a supply conduit 78 for storage in the air tank 72. The tire inflation system 20 is configured to operate one or more valves (not shown) to selectively supply the compressed air from the air tank 72 to one or more of the vehicle wheels via the first conduit 74. Similarly, the one or more valves may be operated to remove compressed air from one or more of the vehicle wheels via the first conduit 74.

In the example embodiment, the control system 16 is configured to operate the tire inflation system 20 to provide compressed air to the dry side air box 32 via the second conduit 76. This enables the air induction system 14 to continue to provide the engine 12 with intake air even in the event the watertight (and airtight) door 44 is closed and preventing normal air intake. As such, the driver is given extra time to attempt to move the vehicle 10 to a location where liquid is no longer being ingested into the air induction system 14. In this way, the tire inflation system 20 is configured to operate the one or more valves to selectively provide the dry side air box 32 with compressed air from either the air compressor 70, the air tank 72, and/or the vehicle wheels.

Figure 2:
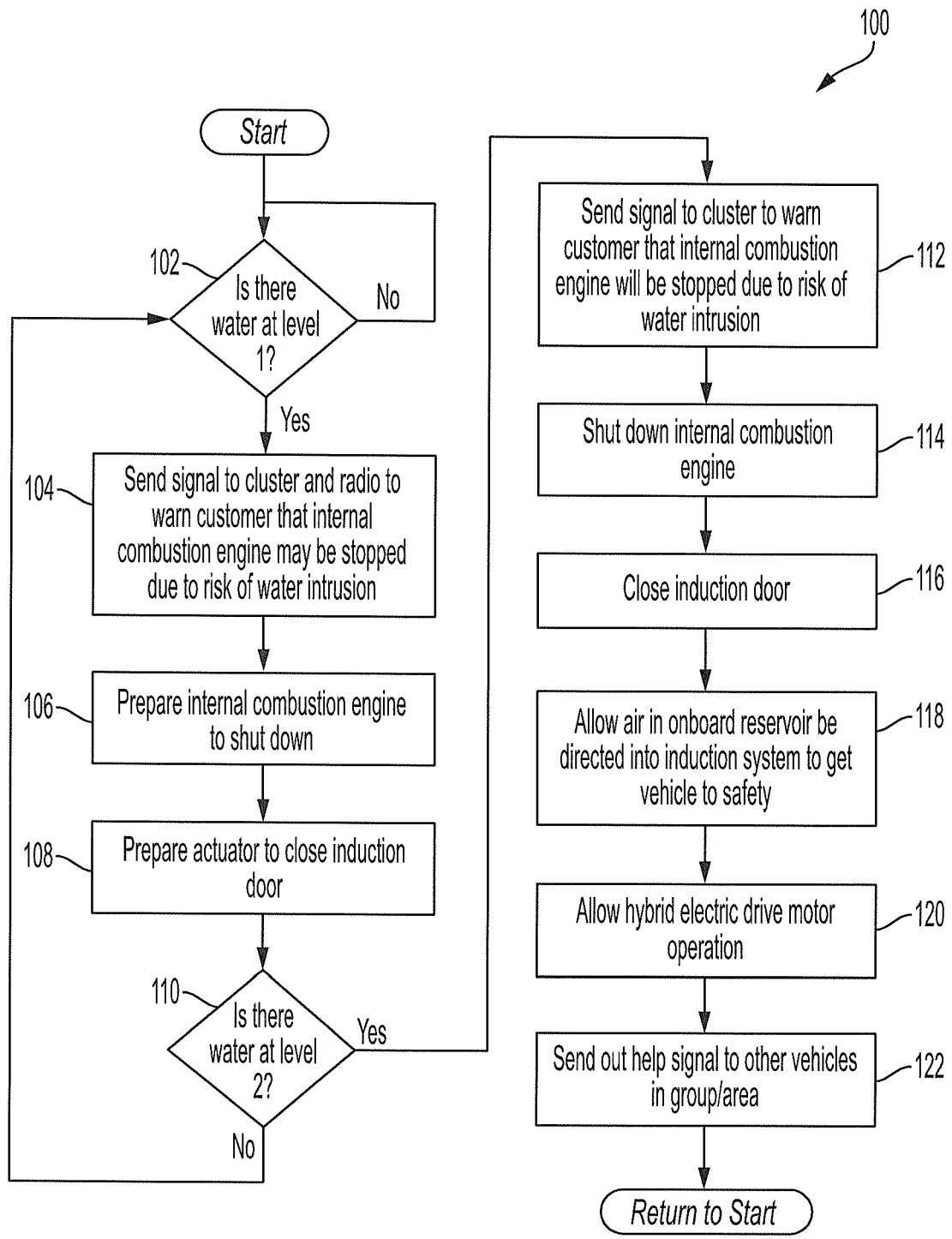
FIG. 2 is a flow diagram of an example method of operation of the vehicle of FIG. 1, in accordance with the principles of the present disclosure.

Turning now to FIG. 2, one example method of operation of air induction system 14 is illustrated. The method 100 begins at step 102 where controller 50 determines, via one or more signals from sensors 38, if a water level in reservoir 34 has reached or exceeded a predetermined first water level. If no, control proceeds returns to step 102. If yes, control proceeds to step 104 and controller 50 sends a signal to generate a notification (e.g., audio, visual, haptic, etc.) via the display 18 or other vehicle component that water has been detected in the air intake system 14 and that engine 12 may be stopped due to risk of water intrusion. At step 106, controller sends a signal to ECM 54 to prepare the internal combustion engine 12 for shutdown. Such preparation can include, for example, sending a signal to the appropriate engine management systems and preparing them for imminent vehicle shutdown to expedite the process once a shutdown signal occurs.

At step 108, controller 50 sends a signal to actuator 46 to prepare to close watertight door 44. Such preparation can include, for example, arming the watertight door actuator 46 to expedite closing the door once a close signal is received from the controller 50. At step 110, controller 50 determines, via one or more signals from sensors 38, if a water level in the reservoir 34 has reached or exceeded a predetermined second water level. If no, control returns to step 102. If yes, control proceeds to step 112 and controller 50 sends a signal to generate a notification via the display 18 or other vehicle component that the internal combustion engine 12 will be stopped due to risk of water intrusion. In some examples, the controller 50 can provide a predetermined amount of time before engine shutdown and direct the driver to move the vehicle to a safe or desired location if not already there. The controller 50 is then configured to shut down the engine after the predetermined amount of time (e.g., 5-30 seconds).

At step 114, controller 50 sends a signal to ECM 54 to shut down the engine 12. At step 116, controller 50 sends a signal to actuator 46 to close the watertight door 44. If equipped with tire inflation system 20, at step 118, controller sends a signal to tire inflation system 20 to supply air to the air induction system 14, for example, to provide additional intake air to the engine 12 and enable the vehicle 10 to keep driving to a location away from the water being ingested. If equipped with electric motor 64, at step 120, controller 50 sends a signal to electric motor control module 62 to activate the electric motor 64, for example, to enable the vehicle 10 to keep driving to a location away from the water being ingested. At step 122, controller 50 sends a signal to radio frequency hub 58, for example, to send out a help signal to other vehicles in the group, area, etc. Control then returns to step 102. However, it will be appreciated, that controller 50 can provide any additional messages or information to the display 18 or other vehicle components based on signals from sensors 38 or other components or systems of the vehicle 10.

Described herein are systems and methods for detecting, warning, and reacting to water ingestion in an air induction system of a vehicle. One or more sensors are disposed within a wet side air box to determine an amount or level of water entering therein. Based on signals from the sensors, the system is configured to provide the driver with messages/warnings about water intrusion and operational state of the engine, close a watertight door in the air induction system to prevent water reaching the engine, and shut down the vehicle engine to prevent damage thereto. The vehicle may include auxiliary systems to enable vehicle locomotion after the watertight door is closed or the internal combustion engine is shut down to thereby allow the driver to move the vehicle to a drier location.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle comprising:
   an internal combustion engine; and
   an air induction system configured to provide intake air to the internal combustion engine, the air induction system comprising:
   an intake port;
   an air box coupled to the intake port and having a wet side air box and a dry side air box;
   a sensor disposed within the air box and configured to detect a presence or level of liquid within the air box; and
   a watertight door disposed within the air induction system and configured to move via an actuator, based on one or more signals from the sensor, between an open position that allows air to pass through the air box dry side, and a closed position that facilitates preventing any ambient air or liquid from passing into the air box dry side and to the engine.

2. The vehicle of claim 1, further comprising a control system including a controller in signal communication with the sensor and the watertight door, wherein the controller is configured to close the watertight door based on one or more signals received from the sensor.

3. The vehicle of claim 2, wherein the controller is configured to close the watertight door when the one or more signals indicate a liquid level in the air box wet side has reached a predetermined level.

4. The vehicle of claim 3, further comprising a vehicle display in signal communication with the controller, wherein the controller is configured to display a message on the vehicle display when the one or more signals indicate the liquid level in the air box wet side has reached the predetermined level.

5. The vehicle of claim 4, wherein the message indicates that the internal combustion engine may be shut down due to risk of liquid intrusion.

6. The vehicle of claim 4, wherein the message indicates that the internal combustion engine will be shut down due to risk of liquid intrusion.

7. The vehicle of claim 6, further comprising a tire inflation system, wherein the controller is configured to direct the tire inflation system to supply air to the dry side air box when the watertight door is in the closed position.

8. The vehicle of claim 7, wherein the tire inflation system comprises an air compressor, an air tank, and a conduit fluidly coupled between the air tank and the dry side air box and configured to supply pressurized air therebetween.

9. The vehicle of claim 3, further comprising a vehicle electric motor, wherein the controller is configured to direct a motor control module to provide electrically powered locomotion to the vehicle when the watertight door is in the closed position.

10. The vehicle of claim 3, further comprising a radio frequency hub in signal communication with the controller, wherein the controller is configured to send a message via the radio frequency hub to other vehicles in a predetermined group and/or area when the one or more signals indicate a liquid level in the air box wet side has reached the predetermined level.

11. The vehicle of claim 2, wherein the control system further includes a radio, an engine control module having a processor and a memory, a body control module, a radio frequency hub, and an instrument panel cluster in signal communication with the controller.

12. The vehicle of claim 1, wherein the watertight door is disposed within the dry side air box.

13. The vehicle of claim 1, further comprising an air filter disposed between the wet side air box and the dry side air box.

14. The vehicle of claim 1, wherein the at least one sensor is a water level sensor.

15. The vehicle of claim 14, wherein the water level sensor is disposed within a reservoir defined in the wet side air box.

16. The vehicle of claim 15, wherein a plurality of drain holes are formed in a floor of the reservoir.

17. A method of operating a vehicle having an internal combustion engine and an air induction system having an intake port and an air box coupled to the intake port, the method comprising:
    monitoring a sensor disposed within the air box and configured to detect a presence or level of liquid within the air box, wherein the air box includes a wet side air box and a dry side air box, and a watertight door disposed within the air box and configured to move between an open position that allows air to pass through the air box dry side, and a closed position that facilitates preventing liquid from passing into the air box dry side;
    closing the watertight door when one or more signals from the at least one sensor indicate a liquid level in the air box wet side has reached a predetermined level;
    displaying, when the liquid level as reached the predetermined level, a message on a vehicle display indicating that the internal combustion engine may be and/or will be shut down due to a risk of liquid intrusion; and
    performing at least one of:
        directing, when the watertight door is moved to the closed position, a tire inflation system to provide air to the internal combustion engine; and
        activating an electric motor to drive the vehicle when the watertight door is moved to the closed position and/or the internal combustion engine is shut down.

18. The method of claim 17, further comprising sending a message via a radio frequency hub to other vehicles in a predetermined group and/or area when the one or more signals indicate a liquid level in the air box wet side has reached the predetermined level.

19. The method of claim 17, wherein the method includes performing both of:
    directing, when the watertight door is moved to the closed position, a tire inflation system to provide air to the internal combustion engine; and
    activating an electric motor to drive the vehicle when the watertight door is moved to the closed position and/or the internal combustion engine is shut down.

* * * * *